United States Patent
Phipps

(10) Patent No.: US 10,164,943 B1
(45) Date of Patent: Dec. 25, 2018

(54) DETECTION AND PREDICTION OF WEB INTERACTION PERFORMANCE ISSUES

(71) Applicant: Workday, Inc., Pleasanton, CA (US)

(72) Inventor: Charles T. W. Phipps, Diablo, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/339,700

(22) Filed: Oct. 31, 2016

(51) Int. Cl.
| | |
|---|---|
| H04L 29/12 | (2006.01) |
| H04L 29/06 | (2006.01) |
| H04L 12/26 | (2006.01) |
| H04L 29/08 | (2006.01) |

(52) U.S. Cl.
CPC ............ *H04L 61/609* (2013.01); *H04L 43/50* (2013.01); *H04L 61/1511* (2013.01); *H04L 67/02* (2013.01); *H04L 67/42* (2013.01)

(58) Field of Classification Search
CPC ....... H04L 61/609; H04L 67/02; H04L 43/50; H04L 67/42; H04L 61/1511
USPC .......................................................... 709/203
See application file for complete search history.

(56) References Cited

U.S. PATENT DOCUMENTS

| | | | | |
|---|---|---|---|---|
| 7,151,966 B1* | 12/2006 | Baier | .................... | G05B 19/056 700/19 |
| 7,725,561 B2 | 5/2010 | Bhogal | | |
| 8,635,340 B1 | 1/2014 | Schneider | | |
| 9,595,077 B1* | 3/2017 | Le | ........................ | G06F 3/04855 |
| 2002/0009992 A1* | 1/2002 | Jensen | .................. | H04W 16/18 455/446 |
| 2002/0129137 A1* | 9/2002 | Mills, III | ............ | G06F 11/3495 709/224 |
| 2003/0002484 A1* | 1/2003 | Freedman | ............... | H04L 45/02 370/352 |
| 2003/0055990 A1* | 3/2003 | Cheline | ............... | H04L 63/0272 709/229 |
| 2003/0217104 A1* | 11/2003 | Hamdan | .................. | H04L 29/06 709/203 |
| 2005/0105798 A1 | 5/2005 | Nguyen | | |
| 2005/0108391 A1* | 5/2005 | Boss | ................... | H04L 41/5009 709/224 |
| 2008/0222306 A1 | 9/2008 | Bhakta | | |
| 2008/0301313 A1 | 12/2008 | Bhogal | | |
| 2010/0057416 A1* | 3/2010 | Peterman | ............ | G06F 17/5004 703/6 |
| 2010/0058366 A1* | 3/2010 | Swildens | ............ | G06F 11/3414 719/329 |
| 2011/0012917 A1* | 1/2011 | Souza | .................... | G06Q 10/10 345/593 |

(Continued)

*Primary Examiner* — David R Lazaro
*Assistant Examiner* — Berhanu Shitayewoldetadik
(74) *Attorney, Agent, or Firm* — Van Pelt, Yi & James LLP

(57) ABSTRACT

A system for estimating client system web interaction performance includes an input interface and a processor. The input interface is configured to receive a plurality of client system locations and associated performance data and to receive a location of interest. The processor is configured to determine an estimated client system web interaction performance based at least in part on the plurality of client system locations and the associated performance data and the location of interest. The performance data is determined based at least in part on determining an internet facing DNS server from a client using an ID code and a testing URL. The processor is further configured to provide the estimated client web interaction performance.

20 Claims, 16 Drawing Sheets

(56) References Cited

U.S. PATENT DOCUMENTS

| | | | |
|---|---|---|---|
| 2011/0153867 A1* | 6/2011 | van de Ven | H04L 29/12811 709/245 |
| 2012/0089920 A1* | 4/2012 | Eick | G08G 1/20 715/739 |
| 2014/0380076 A1* | 12/2014 | Weissmann | G06F 1/324 713/323 |
| 2015/0161257 A1* | 6/2015 | Shivaswamy | G06F 17/30864 707/709 |
| 2016/0112284 A1 | 4/2016 | Pon | |
| 2016/0226731 A1* | 8/2016 | Maroulis | H04L 43/065 |
| 2017/0003984 A1* | 1/2017 | Gatson | G06F 9/44505 |

\* cited by examiner

| Test ID | Timestamp | Country | Good | Ok | Bad |
|---|---|---|---|---|---|
| 513-589-901 | 2016-06-06 04:57:12 AM | USA | 10 | 1 | 7 |
| 672-205-358 | 2016-06-02 09:06:17 PM | USA | 2 | 3 | 2 |
| 789-521-243 | 2016-05-30 04:41:13 AM | USA | 13 | 3 | 2 |
| 643-120-342 | 2016-05-29 10:39:49 PM | Australia | 9 | 2 | 7 |
| 567-243-465 | 2016-05-22 07:02:06 PM | Australia | 12 | 4 | 2 |
| 343-248-567 | 2016-05-22 01:07:08 PM | Japan | 12 | 2 | 4 |
| 643-734-867 | 2016-05-21 07:55:12 AM | USA | 8 | 2 | 8 |
| 937-283-120 | 2016-05-19 02:40:13 PM | Malaysia | 12 | 1 | 5 |
| 458-421-106 | 2016-05-14 01:25:20 AM | Japan | 12 | 3 | 3 |
| 395-924-360 | 2016-05-12 02:07:08 PM | Japan | 9 | 0 | 7 |
| 572-127-392 | 2016-05-04 01:57:34 AM | Japan | 8 | 4 | 3 |

FIG. 13

Test ID: 513-589-901
Email: john.doe.5510@gmail.com
User: jdoe
External IP: 203.217.68.25
Internal IP: 192.168.2.81
Detected Location: Melbourne, AU

| Internet Facing DNS - IP Address | No Information |
|---|---|
| Help | 203.0.113.1 |
| Internet Facing DNS - Provider | No Information |
| Help | Example Company Public DNS Service |
| Internet Facing DNS - Server Location | Bad |
| Help | Tokyo, JP - 8,186 km Away |
| Internet Facing DNS - EDNS0 reported client subnet | No Information |
| Help | 198.51.100.0/24 |
| Internet Facing DNS - EDNS0 subnet location | Good |
| Help | Melbourne, Victoria, AU - 0 km Away |
| CDN Provider A - Edge Node Location | Good |
| Help | Melbourne, Victoria, AU - 0 km Away (192.0.2.111) |
| CDN Provider A - Sustained Latency | Bad |
| Help | Min: 40.6 ms, Med: 601.015 ms, Max: 2524.3 ms |
| CDN Provider A - Sustained Download Bandwidth | Good |
| Help | 1.7975 Mbps (216.70 Mb in 964.5 secs) |

| CDN Provider B - Edge Node Location | Ok |
|---|---|
| Help          Sydney, New South Wales, AU - 713 km Away | |
| CDN Provider B - Sustained Latency | Bad |
| Help          Min: 31.2 ms, Med: 563.285 ms, Max: 954.4 ms | |
| CDN Provider B - Sustained Download Bandwidth | Good |
| Help          3.2691 Mbps (369.67 Mb in 904.6 secs) | |
| Content Provider Data Center Location A - Sustained Latency | Bad |
| Help          Min: 264.8 ms, Med: 310.470 ms, Max: 568.5 ms | |
| Content Provider Data Center Location A - Sustained Download Bandwidth | Good |
| Help          2.9121 Mbps (331.43 Mb in 910.5 secs) | |
| Content Provider Data Center Location B - Sustained Latency | Bad |
| Help          Min: 353.9 ms, Med: 483.14 ms, Max: 743.5 ms | |
| Content Provider Data Center Location B - Sustained Download Bandwidth | Good |
| Help          1.3424 Mbps (152.97 Mb in 911.6 secs) | |

Test ID: 513-589-901
Email: john.doe.5510@gmail.com
User: jdoe

External IP: 203.217.68.25
Internal IP: 192.168.2.81
Detected Location: Melbourne, AU 1. Client Location
2. CDN Provider A Edge Node
3. CDN Provider B Edge Node
4. Content Provider Data Center Location A
5. Internet-Facing DNS Server Test ID: 513-589-901
Email: john.doe.5510@gmail.com
User: jdoe External IP: 203.217.68.25
Internal IP: 192.168.2.81
Detected Location: Melbourne, AU 1. Client Location
2. CDN Provider A Edge Node
3. CDN Provider B Edge Node
4. Content Provider Data Center Location A
5. Internet-Facing DNS Server

Estimated Performance - Worldwide - Current
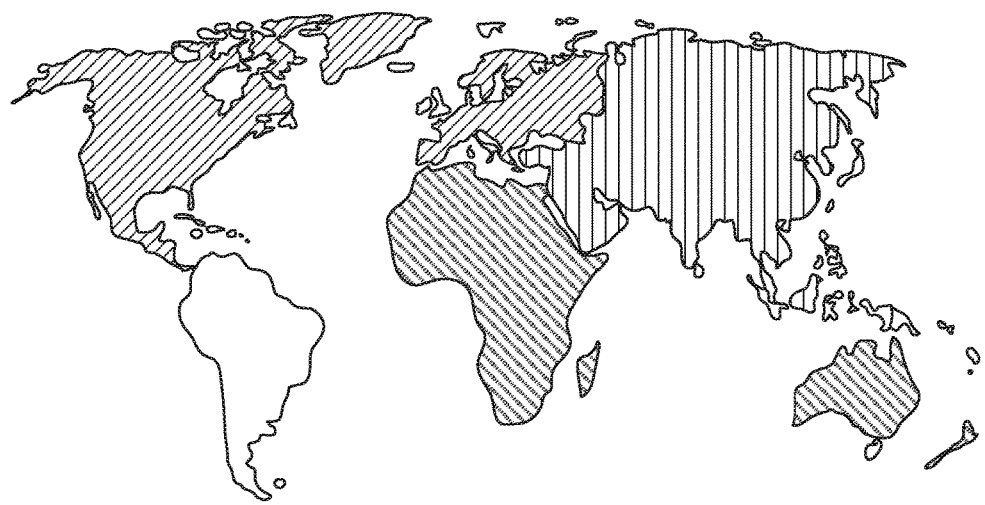
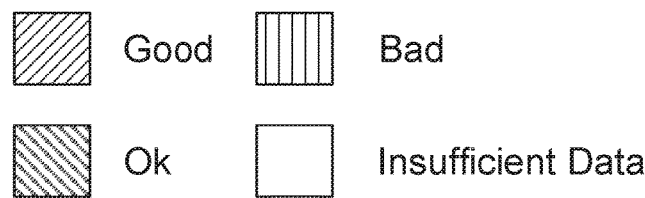
FIG. 17

DETECTION AND PREDICTION OF WEB INTERACTION PERFORMANCE ISSUES

BACKGROUND OF THE INVENTION

A content provider serving content to users distributed around the world can face reports of sub-optimal system performance from users. Frequently, the cause of such sub-optimal performance is not with systems of the content provider, but is due to the configuration of the user's computer, their computer's network connection, or networks between the user and the content provider's servers, including the Internet. Especially when working with non-technical users, it is difficult for the content provider to determine the cause of such sub-optimal performance, and to provide advice to the users on how to resolve the issues.

BRIEF DESCRIPTION OF THE DRAWINGS

Various embodiments of the invention are disclosed in the following detailed description and the accompanying drawings.

FIG. 13 is a block diagram illustrating an embodiment of an output table.

FIG. 14A is a diagram illustrating an embodiment of part of an output table.

FIG. 14B is a diagram illustrating an embodiment of part of an output table.

FIG. 17 is a diagram illustrating an embodiment of an output map.

DETAILED DESCRIPTION

Figure 1:
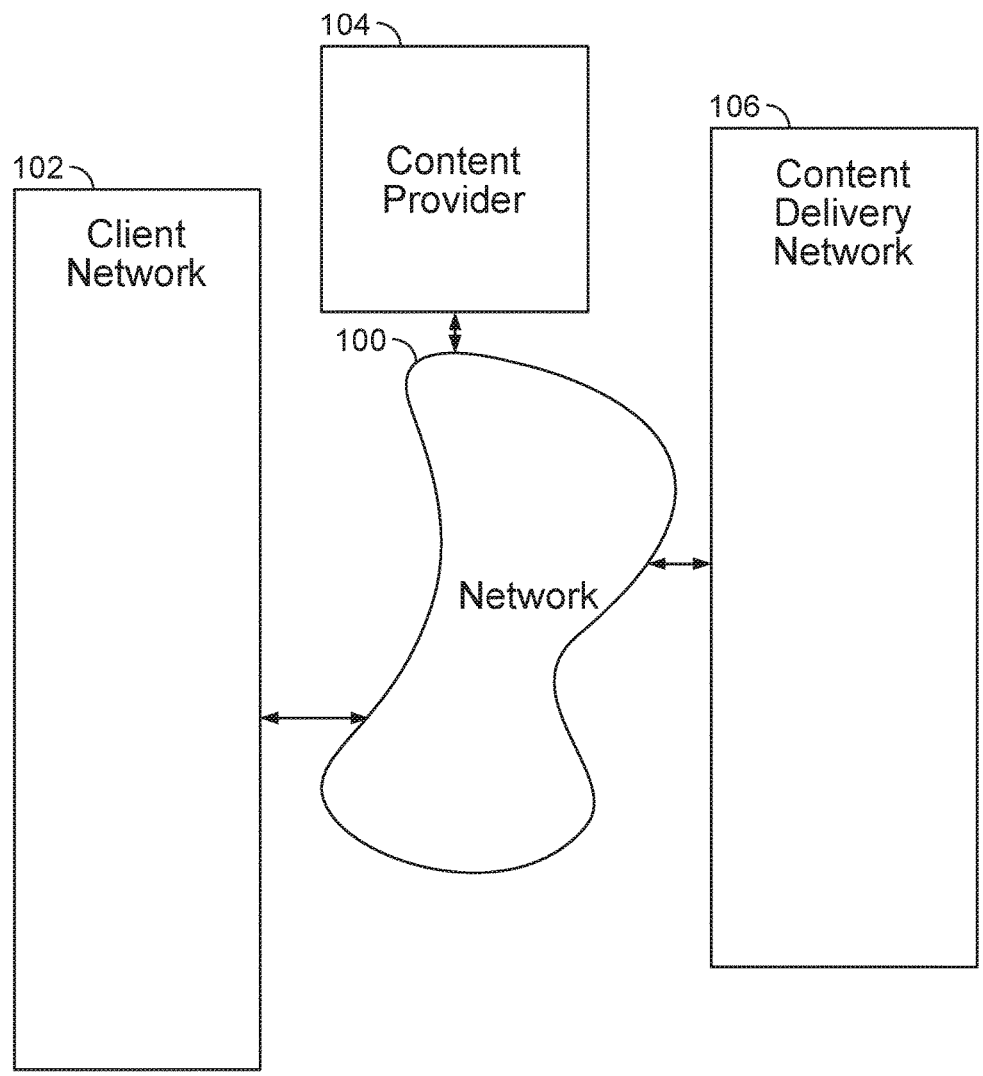
FIG. 1 is a block diagram illustrating an embodiment of system for determining the internet protocol (IP) address of the Internet facing domain name server (DNS) server on a given network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for estimating a client system web interaction performance is disclosed. The system includes an input interface and a processor. The input interface is configured to receive a plurality of client system locations and associated performance data and to receive a location of interest. The processor is configured to determine an estimated client system web interaction performance based at least in part on the plurality of client system locations and the associated performance data and the location of interest, The associated performance data is determined based at least in part on determining an internet facing DNS server from a client system location of the plurality of client system locations using an ID code and a testing URL, The processor is further to provide the estimated client web interaction performance.

A system is disclosed for detecting network conditions and configurations that are likely to impact web performance. The system comprises an input system accessible from a plurality of client system locations that performs measurements from each client system location. The measurements include measurements on the local network and measurements between the client system location and a plurality of target locations. The system also comprises a processor to record and process this performance data from the plurality of clients. In some embodiments, performance is measured from a plurality of client locations to a target locations. The plurality of client locations include both static locations (e.g., the content provider's data centers) and dynamic locations (e.g., locations that are detected from the client's network configuration such as Internet facing DNS servers and content delivery network edge nodes). In various embodiments, performance data comprises a wide variety of measurements that are taken between the plurality of client systems and some or all of the target locations as appropriate including instantaneous network latency, instantaneous bandwidth, sustained latency, sustained bandwidth, geographical distances between client and target locations, Internet Service Providers and Autonomous Systems transited between the client and the target locations, packet loss, integrity of content delivery network hosted files and local client network configuration parameters, or any other appropriate performance data. The system additionally comprises a memory coupled to the processor and configured to provide the processor with instructions.

In some embodiments, the system provides an estimated client web interaction performance from nominated locations-of-interest and to detect and describe any configuration, network or other conditions that may be adversely impacting this performance.

In some embodiments, detection of web interaction performance is disclosed. In the event a content provider system user is experiencing sub-optimal performance, in order to diagnose the problem, an administrator for the content provider system desires to know the status of the user's network configuration and performance measurements between the user's computer and various target locations, where the target locations include centralized servers and dynamically determined servers such as content delivery network edge nodes used to deliver content to the client. A performance assessment tool is run on the client's computer and is used to determine network configuration and performance characteristics of the network that the user's computer is connected to. In some embodiments, this performance assessment tool is run from within a standard Web browser on the client's computer. After the user runs the performance assessment tool, the results are presented to the user and are transmitted to and stored in content provider's database. The results are accessed by the administrator for assistance in diagnosing sub-optimal performance or potential performance issues.

In some embodiments, the geographical location of the user's computer accessing the performance assessment tool is determined, and the user is asked to verify this location or provide accurate location information. This information is used to calculate geographical distance measurements during the test.

In various embodiments, the performance assessment tool collects local network configuration details such as local system internal (e.g. network address translation (NAT)) IP address, local system external Internet IP address, maximum transmission unit (MTU), or any other appropriate network information.

In some embodiments, the performance assessment tool performs measurements of network performance and other characteristics between the user's computer and a static list of target locations. The static list of target locations is delivered to the performance assessment tool upon initiation of the test. This list of target locations may be the content provider's servers or other key network connected devices to which network connectivity may drive the user's experience of performance of the content provider's services.

In some embodiments, the performance assessment tool determines additional dynamic target locations to which network performance should be measured. The target locations may vary based on the client location or the client network configuration. In various embodiments, the target locations include DNS servers, Internet facing DNS servers, content delivery edge nodes, routers, gateways, or any other appropriate locations.

In some embodiments, the user accessing the performance assessment tool is presented with immediate feedback of the performance characteristics that were measured, along with visual and other means of drawing attention to potential problems identified in these measurements. In various embodiments, these potential problems are determined by comparing the performance measurements detected from the user's computer with pre-determined thresholds that are specific to the measurement being made, specific to the target system, specific to the geographical distances between them, or any other relevant factors. In some embodiments, the result of comparing the performance measurements with the pre-determined thresholds is presented to the user in the form of color coded "traffic lights" where green indicates that the measurement is within the expected threshold, yellow or orange indicates that the measurement has exceeded a warning threshold and may be degrading performance and red indicates that the measurement has exceeded the threshold and is likely causing sub-optimal performance when accessing the content provider's system. In various embodiments, the user is presented with the numeric or other results of the measurements collected, descriptions of the measurement processes, descriptions of the measurement's impact on performance and potential remedial actions that could be taken by the user or their network administrators in order to correct or improve the results of the measurement, or any other appropriate information.

In some embodiments, an administrator for a content provider system accesses the results of each client system's assessment including the same results as shown to the user upon completion of the measurement. In various embodiments, the administrator searches for historical results by a variety of search keys such as geographical location, date and time, ISP or AS identifiers, the number of results exceeding the pre-defined thresholds, or any other relevant search criteria. In some embodiments, data collected using the performance assessment tool is aggregated by geography, AS identifier, ISP identifier or other logical aggregation point and displayed to the administrator in table and map formats as desired in order to detect regional or other trends.

In the event a system administrator desires to determine whether performance is likely to be degraded without using the performance assessment tool, historical and aggregated data is used to help the administrator make a prediction. It may be desirable or necessary to avoid using the performance assessment tool to measure instantaneous performance because the client system is not accessible, because it doesn't have the resources available to use the performance assessment tool, because the computer has not yet been installed in its eventual location, or for any other appropriate reason. A prediction can be made based on a plurality of client system locations and associated historical performance data (e.g., the database of aggregated performance assessment data) and on a specific client system (e.g., where the computer for which the prediction is to be made is located). In some embodiments, a prediction is made by selecting a data region comprising the client system location, aggregating performance data from the data region, and estimating web interaction performance based at least in part on the aggregate performance data.

In some embodiments, a system for determining the Internet protocol (IP) address of the Domain Name System (DNS) server is used at the current point in time by an Internet connected computer (herein referred to as the "Internet facing DNS server") to relay DNS requests to the Internet. The system comprises a plurality of components that working together provide an interface to receive a request for a web page from a client system, wherein the request and its processing steps include a DNS lookup, a universal record locator (URL), a processor to determine an identifying (ID) code from the URL, a process to determine the IP address of the Internet facing DNS server that was used to complete the request based at least in part on the ID code, and a process to provide the IP address of the Internet facing DNS server via the resulting synchronously served web page.

To provide a client or customer with service, a content provider ideally provides content from a server located close to the client or customer system. A frequently used piece of information that is utilized to aid in identifying an optimally located content delivery server is the IP address of the Internet facing DNS Server. This IP address is mapped to a physical location by the content delivery network (CDN) and this location serves as a proxy for the location of the user. However, client computer systems are sometimes configured in such a way that the DNS server visible to the content delivery system (the user's Internet facing DNS server) is physically remote from the user, resulting in suboptimal location selection by the content delivery network. Given the complex architecture of the DNS system, even technical end-users and local IT administrators are often not aware of which specific DNS server is the user's network's current Internet facing DNS Server and this often cannot be determined by examining the user's computer. Current solutions for determining the Internet facing DNS server have a number of problems including requiring a user to perform unfamiliar or complex commands, requiring a coordination of steps between the user and the content provider, or requiring a level of access to the user's computer that may not be available or difficult to obtain. This often causes information not to be available and subsequent diagnosis of the resulting poor performance to be hindered.

It is not a straightforward task to determine the identity of the DNS server that is used by the network for relaying DNS requests to the Internet. The architecture of the DNS is such that examining the local computer's DNS configuration will likely not reveal the identity of the Internet facing DNS server. Instead, the computer's network connection needs to be used to send various probes to the Internet hosted DNS infrastructure and the responses to those probes examined to find the identity of the Internet facing DNS server. While well-established methods exist to perform these probes using special purpose network tools, these tools require the user to have a higher level of access rights or operational understanding of their computer than would be required to access Internet content via a Web Browser.

In some embodiments, the Internet facing DNS server's IP address is determined from a standard web browser or a web service and without any specialized knowledge on behalf of the user. Knowing the identity of the Internet facing DNS server on the user's network is important in troubleshooting Internet performance issues related to network configuration, particularly when content delivery networks are in use.

In some embodiments, web browser and/or web service based detection of an Internet facing DNS server is disclosed. When a client accesses content provider data via a CDN, the CDN typically determines the client location by determining the location of the Internet facing DNS server used by the client. The CDN typically chooses a server near to the determined client location in order to efficiently deliver content to the client. An Internet facing DNS server is used by the client's network to determine IP addresses associated with hostname component of the universal resource locators (URL) that the client desires to access (e.g., web sites, etc.). In the event the client system or the network or plurality of networks it is connected to is configured in such a way that its associated Internet facing DNS server is located far from it, the CDN may choose a server near the Internet facing DNS server rather than near the client, resulting in suboptimal content delivery performance. The client experiences the suboptimal performance as an issue with the content provider and may contact the content provider looking for a solution. In order to effectively diagnose this problem (e.g., a suboptimally configured client network, wherein the client uses an Internet facing DNS server located physically far from the client), a tool for easily determining the IP address of a client network's Internet facing DNS server is necessary. The simple solution of asking the client the location of the server does not typically work as the client does not typically know how to determine the IP address of their Internet facing DNS server.

In some embodiments, to detect the IP address of the Internet facing DNS server, the client system is instructed to access a web page located at a detection URL via the hypertext transfer protocol (HTTP) or secure hypertext transfer protocol (HTTPS). The hostname component of the detection URL includes an identifying (ID) code component that uniquely identifies the current instance of the test and should be different each time the detection is performed within a reasonable timeframe. The client system accessing the web page performs a DNS lookup of the hostname contained in the detection URL. The client system provides the hostname to its DNS server, which may forward it to one or more DNS servers before it reaches the Internet facing DNS server that actually performs the DNS lookup via the Internet. The Internet facing DNS server eventually contacts the content provider network associated with the hostname and reaches a content provider DNS server to provide the IP address associated with the hostname. The content provider DNS server recognizes the hostname as part of a detection and determines the ID code from the hostname (e.g., by extracting the part of the hostname string that is known to be the ID code). The content provider DNS server additionally then determines the IP address of the DNS server that made the request by recording the IP address from which the DNS request originated. This DNS server comprises the Internet facing DNS server whose IP address is to be provided to the client system as the result of the detection. The ID code and Internet facing DNS server IP address are associated and stored in a database. In some embodiments, the ID code and Internet facing DNS server are stored as a key—value pair (e.g., the ID code is provided to the database and the Internet facing DNS server IP address is returned). The content provider DNS server then returns to the client system the IP address of a content provider web server (e.g., the content provider web server associated with the detection URL) in its DNS response. The second step of the client system accessing the web page (e.g., at the detection URL) is to provide a request for the web page at the detection URL to the IP address returned by the DNS lookup (e.g., the IP address of the content provider web server). This second step is performed as a transparent part of the web browser's standard operations and is not typically obvious to the user as a distinct step in accessing the web page. The request made by the web browser is a standard HTTP or HTTPS request which includes both the IP address of the content provider web server and the detection URL (e.g., including the ID code contained in the hostname component of the detection URL). When the content provider web server receives the request, it extracts the ID code from the URL and looks it up in the database, receiving the IP address of the Internet facing DNS server. The content provider web server then creates a dynamic web page including the IP address of the Internet facing DNS server and provides it to the client. In some embodiments, the content provider web server additionally performs geolocation on the IP address of the Internet facing DNS server and provides the location of the Internet facing DNS server to the client. In some embodiments, the content provider web server additionally determines the physical distance from the client to the Internet facing DNS server using the location of the client that is optionally included in the HTTP or HTTPS request (e.g., in the URL and/or the POST body) and provides the distance to the client.

In some embodiments, the dynamic web page returned is in a user readable format and provides a graphical or textual means or combination thereof for the user to understand the results. In various embodiments, the user is provided the IP address of the Internet facing DNS server, the geolocation of the Internet facing DNS server, or the distance between the geolocation of the client and the geolocation of the DNS server.

In some embodiments, the dynamic web page returned includes a visual or other indication to the user of whether the distance between the geolocation of the client and the geolocation of the Internet facing DNS server is excessive and therefore likely to be the source of performance issues.

In some embodiments, the dynamic web page returned may be in machine parsable format such as in extensible markup language (XML) or JavaScript Object Notation (JSON).

In some embodiments, a simple, a no-install, no-administration rights required, automated way of determining the Internet facing DNS server is disclosed. The key goals are to:
Automatically detect the Internet facing DNS server (e.g., not rely on information already in possession of the user or provided by information technology (IT) staff or other personnel);
Not require any local workstation dependencies other than a standard web browser with Internet access;
Not require administrative or any elevated local workstation privileges;
Not require any coordination of efforts between the user and content provider personnel;
Not require the download or installation of software packages or applications;
Allow the client to view the results; and
Automatically report the results to the content provider support, anonymously or de-anonymized if permitted by the client.

In some embodiments, to accomplish these goals, the Internet facing DNS server detection must be possible from within a regular web browser, by accessing a standard web page. In some embodiments, a page that gathers a variety of network configuration and performance details is hosted at an address (e.g., http://example.com/performance-trouble-shooter). This page includes access to the DNS server detection URL or a web service that accesses this URL and presents the results to the user. The other parts of the tool exist to present a friendly and simple interface to the end user and to accomplish the other goals stated above such as automatically reporting the results to content provider support.

In some embodiments, a process for determining the IP address of an Internet facing DNS server begins with a client accessing an initiation web page via a standard web browser. In various embodiments, the client indicates a desire to access by typing in to a standard web browser a web page URL, clicking a link, or any other appropriate access triggering. The initiation web page comprises code to initiate the detection. In some embodiments, the initiation web page comprises instructions to the user for determining and verifying a client geolocation. In some embodiments, the client geolocation is ultimately compared to an Internet facing DNS server geolocation in order to inform the client of their physical distance to the Internet facing DNS server. In various embodiments, the initiation web page comprises instructions for the client to generate an ID code for later identification of the request. In various embodiments, the ID code is generated randomly, pseudorandomly, by contacting a content provider server and requesting an ID code, deterministically from the current time, or in any other appropriate way. The initiation web page also includes a URL string whose hostname component includes the ID code to form a detection URL. The URL string comprises a URL directed to a content provider web server.

In some embodiments, to accomplish the Internet facing DNS server detection, a web service is used. In some embodiments, this web service is called via a URL, and the results are returned in JavaScript object notation (JSON) format, extensible markup language (XML) format or another machine parsable format.

In some embodiments, the format of the detection URL is: https://<random-host-name>.<dedicated detection subdomain>.<TLD>—Where <random-host-name> is an ID code that differs each time a detection is performed within a reasonable time period, <dedicated detection subdomain> is a subdomain of the TLD dedicated to performing Internet facing DNS server detection, and <TLD> is a top-level domain. Each component conforms to the requirements of an Internet hostname described in an appropriate Internet protocol (e.g., RFC 1123). The ID code could be generated by a random number or string generator on the client, be specified by the end-user or even be as simple as high-resolution timestamp. The dedicated detection subdomain could be a name that describes the detection service and the TLD could be the TLD of the entity hosting the tool. For example:
https://bhg6xpykmcp5fzpc.dnswhoami.example.com.

In some embodiments, when this URL is opened, a JSON, XML or other machine parsable structured response is returned by the server that contains the IP address of the Internet-facing DNS server that was detected, plus additional (and optional) geographical details of its location as returned by a variety of IP-based geolocation services and/or details of the extension mechanisms for DNS (EDNS0) client-subnet information included in the DNS query (in the event that the DNS servers in the query flow support EDNS0). This result is then used by the web application to both display the results to the user and to automatically send the results to the content provider support.

By standard Internet convention, the DNS lookup and HTTP request phases of fetching a URL are completely independent, to a level where they are served by different servers with no knowledge of each other. In some embodiments, the mechanism to detect the Internet-facing DNS Server requires the DNS and Web Server to be tightly interlocked. It involves four key components: a parent domain authoritative DNS server, a modified authoritative DNS server, a web server, and a database server.

In some embodiments, the DNS server hosting the name server (NS) records for the parent of the domain used to host the detection system must delegate a subdomain to a specially modified DNS server. In the example above, the DNS server for "example.com" delegates the "dnswhoami.example.com" domain to a specially modified DNS server. This delegation ensures that all hostnames under the detection system's domain are resolved by the modified DNS server, and are therefore subject to the enhanced processing described herein. A single hostname cannot be used to host this service as the hostname portion of the fully qualified hostname is used as a unique identifier for the query.

In some embodiments, the modified DNS server is a standard authoritative DNS server with a modification so that queries for "A" (or "AAAA" if IPv6 is used) trigger the execution of code that records the IP address of the server from which it received the request in a database using the hostname as the key, and then responds with the IP address of a web server that provides the response. The modified DNS server acts as the "intercept" for the DNS request, detects the IP address of the Internet-facing DNS server and passes it to the database for recording and later retrieval by the web server when the browser's hypertext transmission protocol (HTTP) or secure hypertext transmission protocol (HTTPS) request is received.

In some embodiments, the web server responds to the browser's HTTP or HTTPS request by looking up and responding with the details of the DNS interception performed by the modified DNS server. This provides a browser-compatible way of reporting the results of the interception in a way that can be visible to the user, and accessible from JavaScript code running within the web page without the need for DNS specific or other special purpose software to be installed or run on the user's computer.

In some embodiments, the database server acts as a temporal store for hostname/data pairs generated by the modified DNS server. The web service must be able to retrieve the results of the DNS intercept in order to return the results to the user. These results cannot be returned by the DNS server as it can only return a DNS response and by convention, raw DNS responses cannot be accessed by JavaScript code in a web page, so the database server "caches" the results for retrieval by the web server very soon (typically a fraction of a second) after the DNS lookup is complete.

FIG. 1 is a block diagram illustrating an embodiment of system for determining the internet protocol (IP) address of an Internet facing domain name server (DNS) server on a given network. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client network 102, content provider 104, and content delivery network 106 communicate via network 100. In the example shown, client network 102 comprises a network of a client organization to content provider 104. In some embodiments, a client organization comprises an organization, members of which receive content from content provider 104. In some embodiments, client network 102 comprises a distributed network of computers. In some embodiments, client network 102 comprises computers at physically distant locations (e.g., in multiple countries, in multiple continents, etc.). Content provider 104 comprises a content provider for providing content to one or more client networks (e.g., client network 102). In some embodiments, content provider 104 provides content to client networks via content delivery network 106. In some embodiments, content provider 104 comprises a system for determining an IP address of an Internet facing DNS server. Content delivery network 106 comprises a content delivery network for delivering content from a content provider (e.g., content provider 104). In some embodiments, content delivery network 106 comprises a plurality of geographically distributed content delivery servers for delivering content. In some embodiments, content delivery network 106 determines an appropriate content delivery server based on the location of a client requesting content and delivers content to the client using the determined content delivery server.

Figure 2:
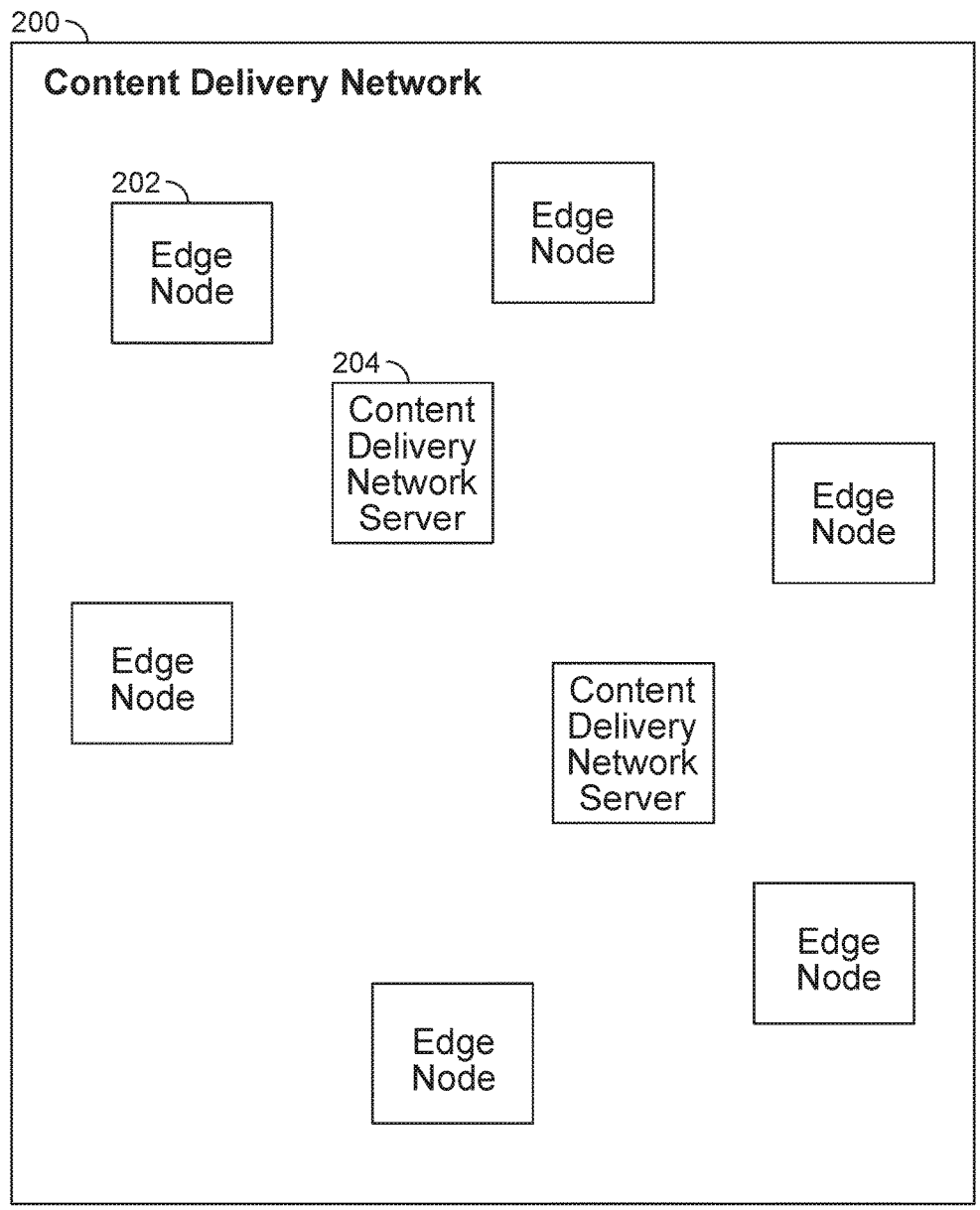
FIG. 2 is a block diagram illustrating an embodiment of a content delivery network.

FIG. 2 is a block diagram illustrating an embodiment of a content delivery network. In some embodiments, content delivery network 200 comprises content delivery network 106 of FIG. 1. In the example shown, content delivery network 200 comprises a content delivery network for delivering content to geographically distributed clients (e.g., a set of clients distributed over a wide geographic area). Content delivery network 200 comprises a plurality of edge nodes (e.g., edge node 202) for delivering content to clients. The plurality of edge nodes are distributed over a wide geographical area (e.g., across a plurality of countries, a plurality of continents, etc.). Content delivery network 200 comprises a plurality of content delivery network servers (e.g., content delivery network server 204). In various embodiments, each content delivery network server provides content to one or more edge nodes to keep the edge node content up to date, monitors the performance of the edge nodes, determines which edge node should deliver content to a particular client, or performs any other appropriate content delivery network server task.

Figure 3:
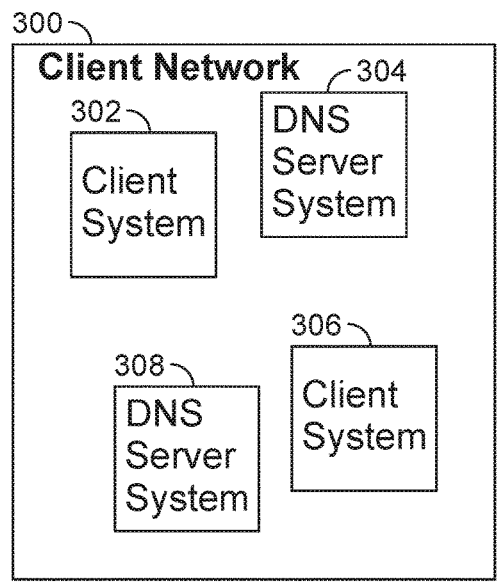
FIG. 3 is a block diagram illustrating an embodiment of a client network.

FIG. 3 is a block diagram illustrating an embodiment of a client network. In some embodiments, client network 300 of FIG. 3 comprises client network 102 of FIG. 1. In various embodiments, client network 300 comprises one or more client systems (e.g., client system 302 or client system 306) and DNS server systems (e.g., DNS server system 304 or DNS server system 308), and any other appropriate systems. In some embodiments, a client system comprises a system accessed by a user for accessing a network (e.g., an intranet within client network 300, an external network, the Internet, etc.) for working with data and/or applications. In some embodiments, a DNS server system comprises a system for executing DNS requests to retrieve IP addresses via the Internet. In some embodiments, the systems of client network 300 are geographically distributed (e.g., distributed over a wide geographical area).

Figure 4A:
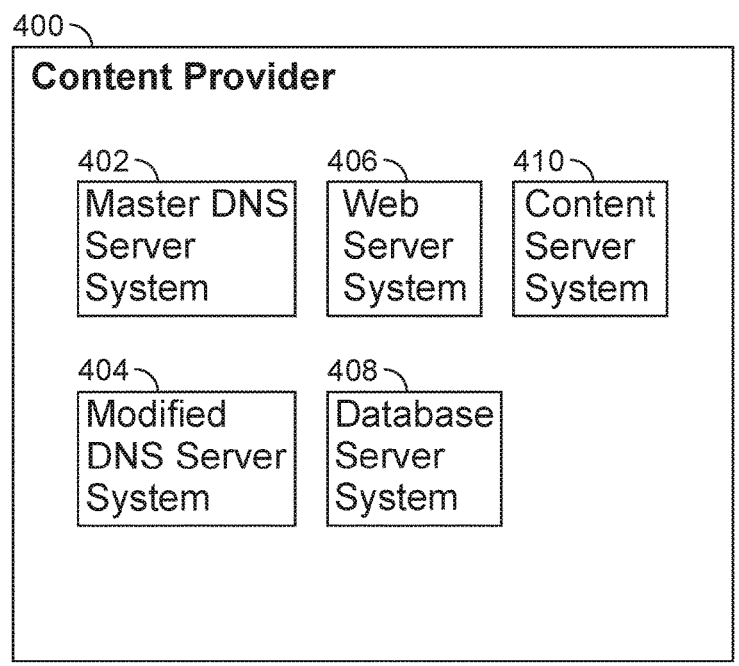
FIG. 4A is a block diagram illustrating an embodiment of a content provider.

FIG. 4A is a block diagram illustrating an embodiment of a content provider. In some embodiments, content provider 400 comprises content provider 104 of FIG. 1. In some embodiments, content provider 400 comprises a content provider for providing content (e.g., database data, audio data, video data, or any other appropriate content). In some embodiments, content provider 400 comprises a content provider for determining an IP address of an Internet facing DNS server. In the example shown, content provider 400 comprises authoritative DNS server system 402. In some embodiments, authoritative DNS server system 402 comprises a DNS server system for responding to DNS requests directed to content provider 400. In some embodiments, in the event a DNS request is received by content provider 400, authoritative DNS server system 402 processes the request and provides a DNS response (e.g., an IP address) to the requesting system. In some embodiments, in the event authoritative DNS server system receives a DNS request within a specific detection subdomain (e.g., "dnswhoami.example.com" within the content provider domain of "example.com"), authoritative DNS server system 402 responds to the client directing them to make their request to modified DNS server system 404. In various embodiments, modified DNS server system 404 comprises a system for determining an ID code from a hostname, for determining an IP address of the requesting DNS server, for providing an ID code and an IP address to database server system 408 for storage, or for any other appropriate purpose. Web server system 406 comprises a web server system for providing a web page. In some embodiments, web server system 406 comprises a system for determining an IP address. In various embodiments, web server system comprises a web server system for receiving a request for a web page at a URL from a client system, determining an ID code from a requested URL, determining an IP address based at least in part on the ID code, requesting an IP address from database server system 408, creating a web page including the IP address, determining geolocation information from the IP address, including geolocation information in the web page, providing the web page to the requesting client system, or for performing any other appropriate web server system task. Content server system 410 comprises a content server system for storing and/or providing content. In some embodiments, content server system provides content directly to a client system. In some embodiments, content server system provides content to a content distribution network for providing to a client system. In various embodiments, the elements of content provider 400 comprise separate systems, are combined into a single system, or are combined into a plurality of systems in any appropriate way. In various embodiments, authoritative DNS server system 402 and modified DNS server system 404 are combined into a single DNS server system or are implemented as separate systems or the authoritative DNS server may be hosted by a third party. In various embodiments, database server system 408 is implemented as part of web server system 406, as part of modified DNS server system 404, as a separate system, or in any other appropriate way.

Figure 4B:
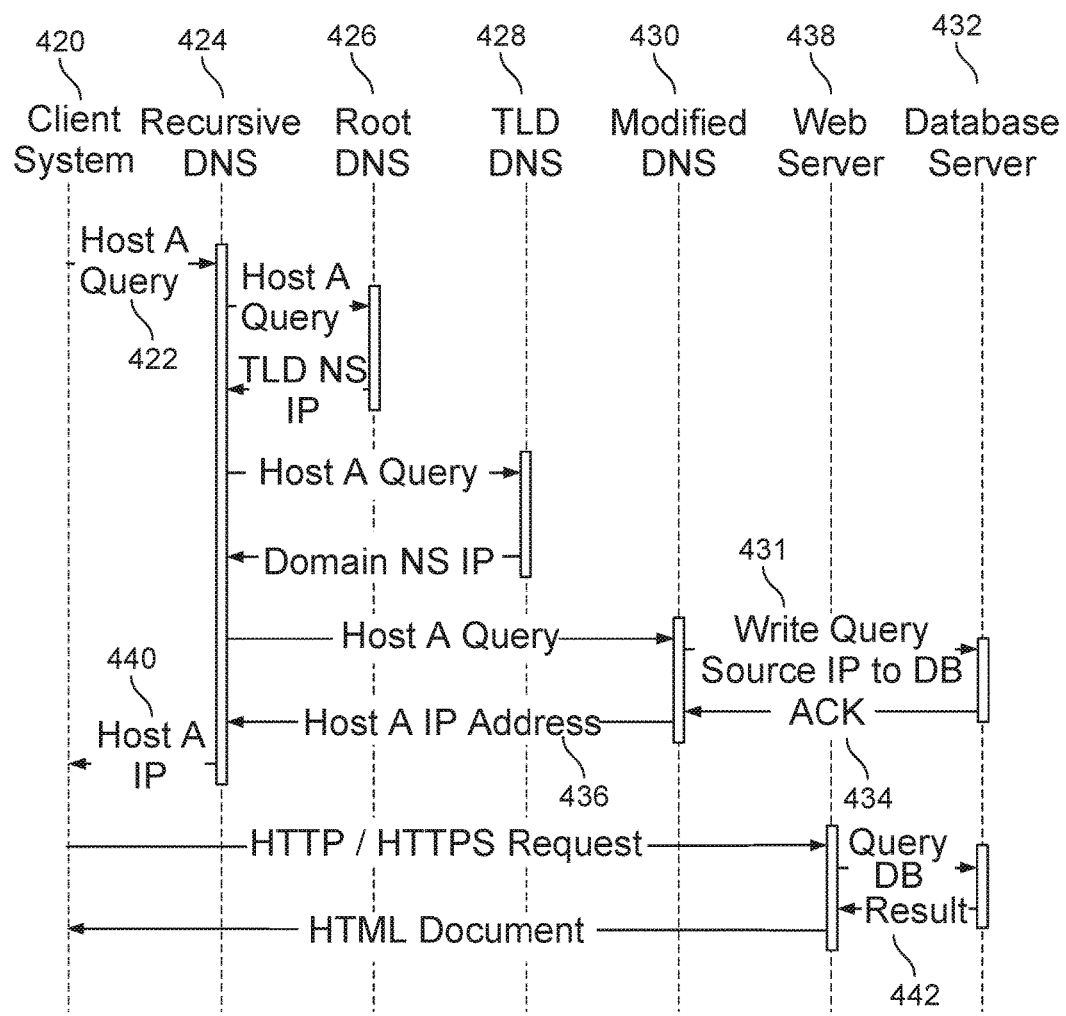
FIG. 4B is a diagram illustrating an embodiment of a system for determining the internet protocol (IP) address of the Internet facing domain name server (DNS) server on a given network.

FIG. 4B is a diagram illustrating an embodiment of a system for determining the internet protocol (IP) address of an Internet facing domain name server (DNS) server on a given network. In some embodiments, the process of FIG. 4B is implemented using the system of FIG. 1. In the example shown, the system for determining an IP address of an Internet facing DNS server comprises the following steps:

1. Client system 420 generates a query (e.g., a query that includes a random string of numbers/letters that complies with the Internet protocol—for example, RFC 1123—and concatenates the random string with the discovery domain name—for example, ".dnswhoami.example.com"); ☐
2. Client system 420 (e.g., specifically a web browser running on client system 420) initiates a DNS Address ("A") query (Host A Query 422) to resolve the IP address for the hostname. In this example, "test123.dnswhoami.example.com" is used as the hostname, where "test123" stands for the random portion that the client system previously generated; ☐
3. The DNS query passes through the user's network's infrastructure until it reaches recursive DNS server 424 that is Internet facing and that will actually perform the lookup via the Internet DNS infrastructure; ☐
4. Recursive DNS server 424 performs the lookup of the name by standard DNS recursion; it queries Root DNS server 426 for the IP address of the DNS server that services the top level domain (TLD DNS server 428) (e.g., ".com" in this case) and continues recursively until it reaches modified DNS server 430 that has been delegated authority over the domain (e.g., "dnswhoami.example.com"); ☐
5. Modified DNS server 430 notes the IP address from which the query originated and the hostname being queried. Prior to returning a DNS answer, it calls database server 432 (e.g., write query source IP to DB 431) to write a simple key/value pair entry with the key being the unqualified hostname (e.g., "test123") and the value being the IP address from which the query originated; ☐
6. Once the DB server confirms that the key/value has been written (e.g., ACK 434), the modified DNS server returns the Host IP address 436 of Web Server 438 as a response to the DNS "A" query with a very short (typically zero) time to live (TTL) instruction; ☐
7. Recursive DNS server 424 receives this response, and notes the zero TTL so it will not cache the answer. It passes the answer to the client system (e.g., Host A IP 440); ☐
8. Web Browser of client system 420 opens a connection to the IP address of Web Server 438 it received in host A IP 440 and requests the default ("/") page. Since modern browsers use the hypertext transfer protocol (HTTP—for example, HTTP 1.1 protocol), the hostname that the Web Browser is attempting to connect to is also passed with this request. It will look similar to: ☐
GET/HTTP/1.1
Host: test123.dnswhoami.example.com
9. Web Server 438 performs a look up to database server 432 using the unqualified portion of the hostname in the HTTP 1.1 GET request as the key (e.g. "test123". Database server 432 returns the value that was stored in write query source IP to DB 431 (e.g., the IP address from which the DNS server received the query); ☐
10. Web Server 438 performs optional geolocation and other convenience actions based on this IP address, such as locating the internet service provider (ISP) and autonomous system (AS) responsible for the address, its approximate geolocation and other details that may be of use to the user; ☐
11. Web Server 438 structures the result using user viewable markup, or JSON, XML or another machine parsable format and returns it to the client system; ☐
12. Database server 432 can delete the key/value pair once it has been retrieved since it is not going to be re-used. This deletion can be either immediate upon initial fetch, or as a periodic cleanup operation. As long as either the value has been retrieved by web server 438 (e.g., result 442) or sufficient time has passed so that the flow can be considered interrupted (e.g., 3 minutes in an extremely latency prone environment), the key/value pair is no longer useful and can be deleted.

Figure 5:
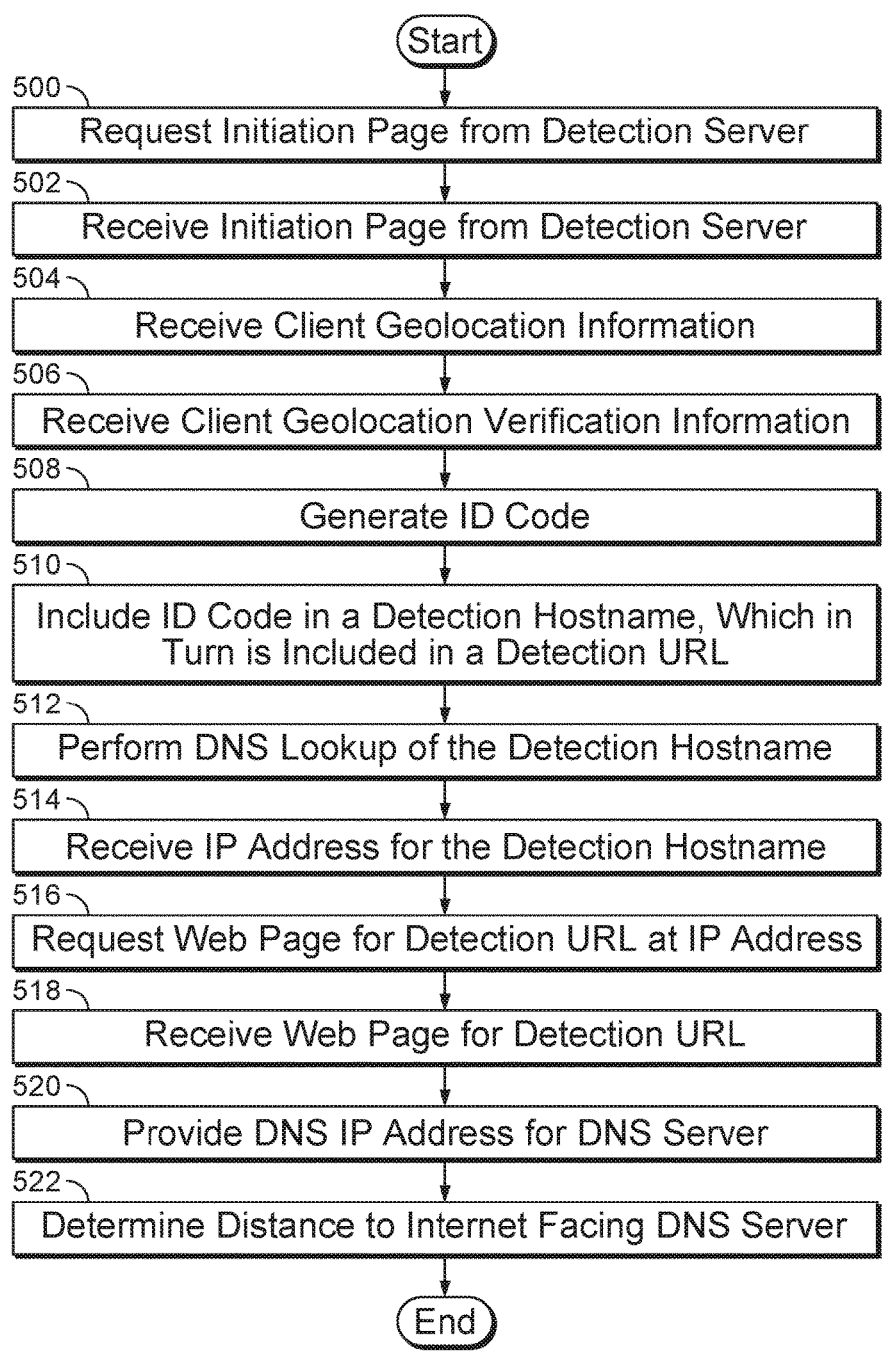
FIG. 5 is a flow diagram illustrating an embodiment of a process for a client system.

FIG. 5 is a flow diagram illustrating an embodiment of a process for a client system. In some embodiments, the process of FIG. 5 is executed by a client system (e.g., client system 302 of FIG. 3) in communication with a user. In some embodiments, the process of FIG. 5 comprises a process for determining an IP address of the Internet facing DNS server utilizing a system for determining an IP address. In the example shown, in 500, an initiation page is requested from a detection server. In various embodiments, requesting the initiation page comprises following a web link, typing in a URL, following a web redirect, or requesting the initiation page in any other appropriate way. In 502, the initiation page is received from the detection server. In some embodiments, the initiation page comprises instructions for performing a client geolocation. In 504 client geolocation information is received (e.g., from looking up the client IP address using a geolocation server). In 506, client geolocation verification information is received (e.g., the user is prompted to verify that the geolocation is correct). In some embodiments, client geolocation verification information comprises a verification that the client geolocation information is correct. In some embodiments, client geolocation verification information comprises corrected geolocation information. In 508, an ID code is generated (e.g., according to instructions in the initiation page). In various embodiments, the ID code is generated randomly, pseudorandomly, by querying a server, deterministically from the current time, or in any other appropriate way. In 510, the ID code is included in a detection hostname which in turn is included in a detection URL. In some embodiments, the detection URL comprises the hostname within a detection subdomain within a content provider domain. In 512, the client system performs a DNS lookup of the detection hostname contained within the detection URL (e.g., as a first step to retrieving a web page at the detection URL). In some embodiments, performing a DNS lookup of the detection hostname comprises providing the detection hostname to a DNS server for DNS lookup. In some embodiments, the DNS server further forwards the request before DNS lookup is performed. In 514, the client system receives an IP address for the detection hostname (e.g., as the response to the DNS lookup). In some embodiments, the IP address comprises the IP address for a content provider web server. In 516, a web page for the detection URL is requested at the IP address. In 518, the web page for the detection URL is received. In some embodiments, the web page comprises the IP address of the Internet facing DNS server associated with the client. In some embodiments, the web page comprises geolocation information associated with the Internet facing DNS server. In 520, the IP address is provided for the Internet facing DNS server. For example, the IP address for the Internet facing DNS server based at least in part on the information associated with the web page received for the testing URL. In some embodiments in 522, a distance to the Internet facing DNS server is determined (e.g., by determining the distance between client geolocation information and geolocation information associated with the Internet facing DNS server).

Figure 6:
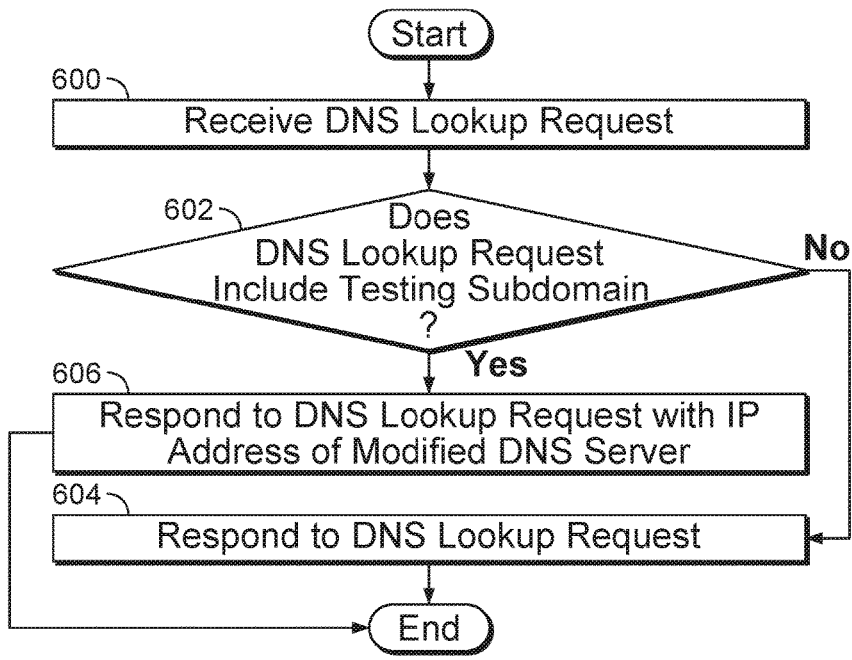
FIG. 6 is a flow diagram illustrating an embodiment of a process for an authoritative DNS server system.

FIG. 6 is a flow diagram illustrating an embodiment of a process for an authoritative DNS server system. In some embodiments, the authoritative DNS server system comprises an authoritative DNS server system of a content provider. In some embodiments, an authoritative DNS server system comprises a content provider DNS server system. In some embodiments, the process of FIG. 6 is executed by authoritative DNS server system 402 of FIG. 4. In the example shown, in 600, a DNS lookup request is received. In some embodiments, the DNS lookup request is received from an Internet facing DNS server. In some embodiments, the DNS lookup request comprises a DNS lookup request for a content provider domain or a subdomain within a content provider domain. In 602, it is determined whether the DNS lookup request includes a testing subdomain. In some embodiments, the testing subdomain comprises a testing subdomain within a content provider domain (e.g., "dnswhoami.example.com" within the content provider domain of "example.com"). In the event it is determined that the DNS lookup request includes the testing subdomain, control passes to 606. In 606, the DNS lookup request is responded to with IP address of modified DNS server (e.g., modified DNS server system 404 of FIG. 4), and the process ends. In the event it is determined in 602 that the DNS lookup request does not include the testing subdomain, control passes to 604. In 604, the authoritative DNS server responds to the DNS lookup request, and the process ends.

Figure 7:
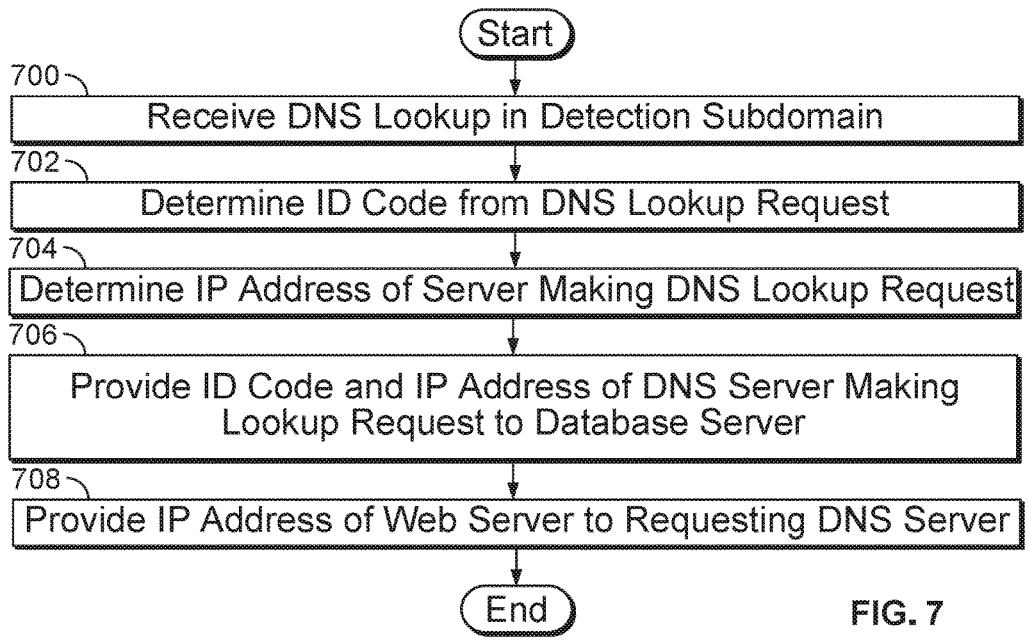
FIG. 7 is a flow diagram illustrating an embodiment of a process for a modified DNS server system.

FIG. 7 is a flow diagram illustrating an embodiment of a process for a modified DNS server system. In some embodiments, the process of FIG. 7 is executed by modified DNS server system 404 of FIG. 4. In some embodiments, the modified DNS server system comprises a content provider DNS server. In the example shown, in 700, a DNS lookup request in a detection subdomain is received. For example, the request is received from the Internet facing DNS server. In 702, an ID code is determined from the DNS lookup request. In some embodiments, the ID code comprises a hostname within the detection subdomain (e.g., "test123" of "test123.dnswhoami.example.com"). In 704, the IP address of the server making the DNS lookup request is determined. For example, as per standard Internet protocols, the IP address of the server making the DNS lookup request is included as part of the DNS lookup request. In 706, the ID code and the IP address of the DNS server making the lookup request are provided to a database server (e.g., database server system 408 of FIG. 4). In some embodiments, the ID code and the IP address of the DNS server providing the lookup request are stored by the database server. In some embodiments, the ID code and the IP address of the DNS server making the lookup request are stored by the database server as a key—value pair (e.g., the database server is configured to provide a value from the database in response to an input key; the ID code is stored as the key and the IP address of the DNS server making the lookup request is stored as the value). In 708, the IP address of a web server (e.g., web server 406 of FIG. 4) is provided to the requesting DNS server.

Figure 8:
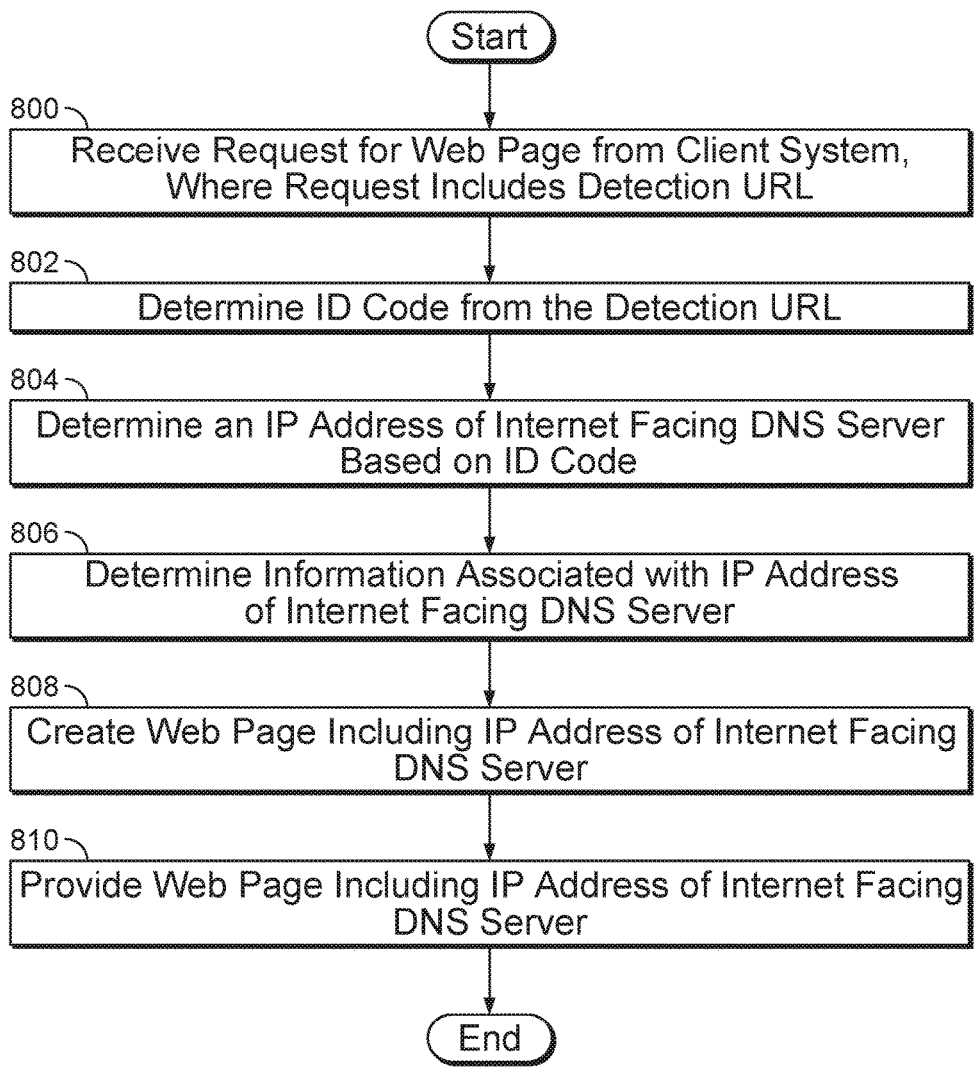
FIG. 8 is a flow diagram illustrating an embodiment of a process for determining an IP address.

FIG. 8 is a flow diagram illustrating an embodiment of a process for determining an IP address. In some embodiments, the process of FIG. 8 is executed by a web server (e.g., web server 406 of FIG. 4). In the example shown, in 800, a request is received for a web page from a client system, wherein the request includes a detection URL. In some embodiments, the request is provided to the web server by the client system after the client system performs a DNS lookup of the detection URL and receives in response the IP address of the web server. In 802, the web server determines an ID code from the detection URL. In some embodiments, the ID code is determined from the hostname component of the detection URL in the same way as it is determined by the modified DNS server in the process of FIG. 7. In 804, an IP address of an Internet facing DNS server is determined based at least in part on the ID code. In some embodiments, determining the IP address of the Internet facing DNS server comprises providing the ID code to a database server in a query. In some embodiments, determining the IP address of the Internet facing DNS server comprises receiving the IP address from a database server (e.g., in response to the ID code). In 806, information associated with the IP address is determined. In some embodiments, information associated with the IP address comprises a geolocation associated with the IP address. In 808, the web page is created (e.g., the web page requested in 800), including the IP address of the Internet facing DNS server. In some embodiments, the web page additionally comprises the information associated with the IP address of the Internet facing DNS server. In 810, the web page is provided, wherein the web page includes the IP address of the Internet facing DNS server.

Figure 9:
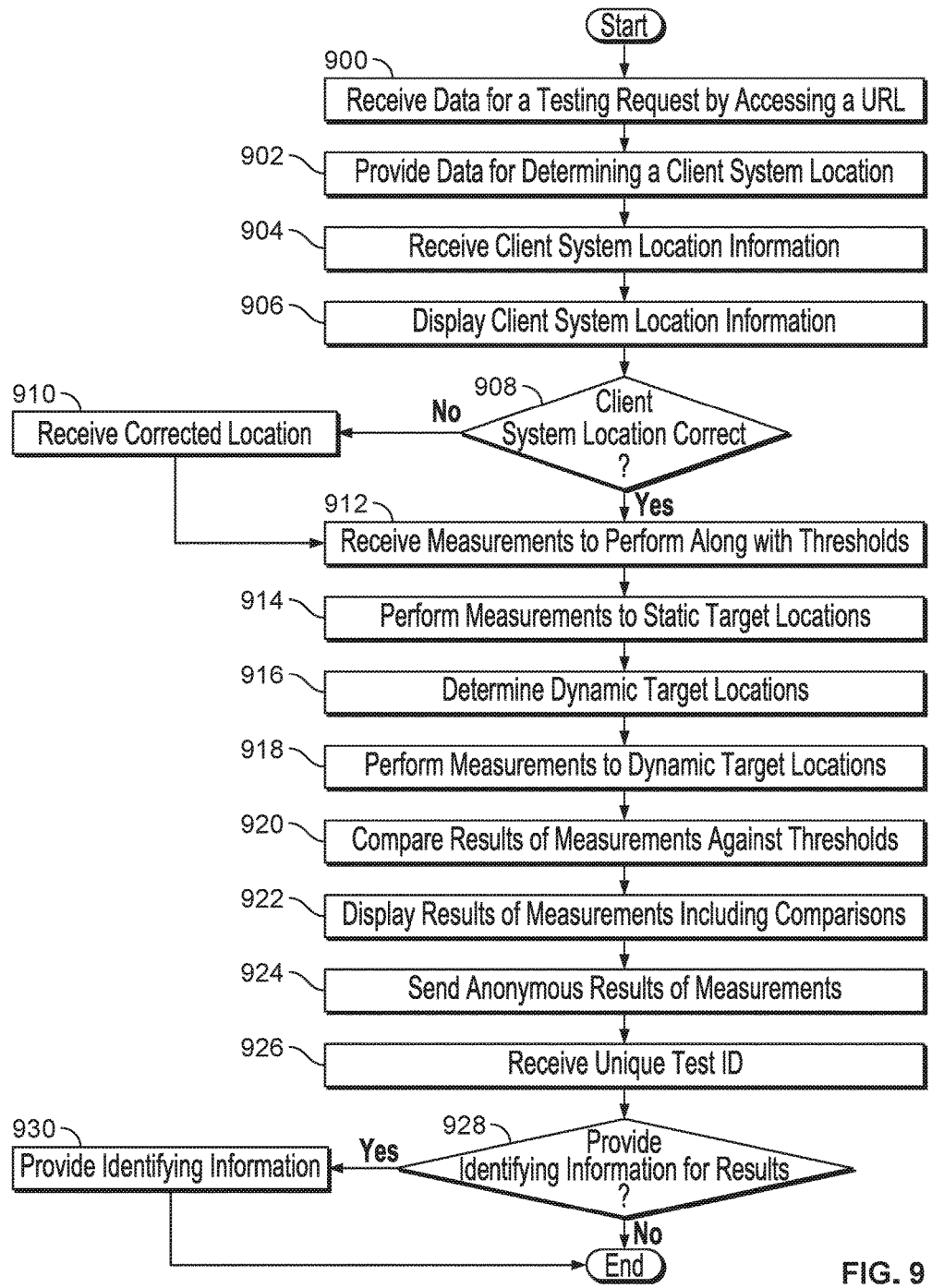
FIG. 9 is a flow diagram illustrating an embodiment of a process for performing measurements on or from the client system with a goal of detecting suboptimal performance and in some embodiments notifying the user of the results and transmitting these to the content provider, the "performance assessment tool."

FIG. 9 is a flow diagram illustrating an embodiment of a process for performing measurements on or from the client system with a goal of detecting suboptimal performance and in some embodiments notifying the user of the results and transmitting these to the content provider, the "performance assessment tool." In some embodiments, the process of FIG. 9 is performed by client system 302 of FIG. 3. In the example shown, in 900, data is received for a testing request by accessing a URL. For example, a client system receives data to perform a testing request by opening a URL at which the performance assessment tool is hosted. In 902, data is provided for determining a client system location. For example, a content provider server is provided with information (e.g., the client system's external IP address) to assist the server in determining the location of the client system. In various embodiments, using the IP address and other information from the client system or the client system's connection, the content provider server determines or estimates a location using a lookup table, a service, a heuristic, a combination of these, or any other appropriate location determining method. In 904, client system location information is received. For example, the determined or estimated client system location information is provided to the client system. In 906, the client system location information is displayed. For example, the determined or estimated location (and in some embodiments, other information relevant to this detection such as the IP address used to detect the location) is displayed to the user for review and verification. In 908, it is determined whether the client system location is correct. For example, a user is prompted for a determination of whether the client system location as determined or estimated is correct. In the event that the client system location information is not correct, in 910 a corrected location is received and control passes to 912. For example, a user is prompted to provide a corrected location to the system and the system receives a more correct or more accurate location from the user. In the event that the client system location is correct, control passes to 912. In some embodiments, the user is not given the opportunity to correct the location information by specifying a more correct or more accurate location. In 912, measurements to perform are received along with thresholds. For example, the client system receives a set of measurements to be performed. In various embodiments, the measurements to perform include one or more of the following: examining the configuration of the local computer, examining the configuration of the local computer's network connection, performing instantaneous network performance measurements to a plurality of target systems, performing sustained network performance measurements to a plurality of target systems, determining Internet facing DNS Server IP address and location, determining content distribution network edge node locations, verifying the integrity of content as fetched by the client system, or any other relevant measurements. In some embodiments, information received regarding the set of measurements to be performed includes a list of target locations in the form of IP addresses, uniform resource locators (URLs) or other relevant formats. In 914, the measurements are performed to static target locations. For example, the client system determines the relevant static target locations based on factors relevant to the local system's configuration and the configuration of the network it is connected to and performs the appropriate measurements. In 916, dynamic target locations are determined. For example, a new list of target locations to which measurements need to be made are determined from the results of the measurements performed in 914. These dynamic targets may include the IP addresses, URLs or other identifiers of the content delivery network edge node currently associated with the client system, network gateways, routers or other network devices detected during the measurements via the client system's network connection. In 918, measurements are performed to the dynamic target locations. For example, the client system performs measurements towards each of the dynamic targets detected in 916 as appropriate. In 920, results of the measurements are compared against thresholds. For example, upon completion of the measurements, the results of the measurements are compared against a pre-defined list of measurement, target system, and other test or parameter specific thresholds to determine whether the results of the measurement meet or exceed the relevant thresholds. In 922, the results of the measurements including comparisons are displayed. For example, raw measurement results to static and dynamic targets are displayed to the user as well as their performance with respect to the thresholds. In various embodiments, this display takes a variety of forms including the raw measurement result, the result averaged over the duration of the test, summarized results, threshold compliance using textual descriptions (e.g. "good", "warning", "bad", etc.), threshold compliance using graphical descriptions such as a green, yellow, and red traffic light representing good, warning and bad statuses, or other relevant graphical or textual means. In some embodiments, additional information is displayed to the user such as the impact on performance of a measurement result exceeding one or more thresholds, details on how the measurement was performed, recommendations to improve the measurements and other relevant details.

In various embodiments, the static and/or dynamic target measurements and their comparison against thresholds, and display to the user, are performed in series, in parallel, or as each measurement is completed. In 924, the results of the measurements are sent anonymously. For example, anonymized test results are sent to the content provider server to be stored in a database. In 926, a unique test ID is received. For example, a unique test identifier (ID) is generated by the content provider system and associated with the results of the measurements performed and the identifying information if supplied in 930. The unique test ID is used to identify the test results in a database. In some embodiments, the results of the performance assessment tool are sent to the content provider system which comprise the test ID (if already associated with a session of tests/results), the client system location and configuration, the results of the measurements performed and their compliance to the relevant thresholds and the identifying information provided in 930, if any. In some embodiments, 924 and 926 take place at the end of the performance assessment process or at multiple stages within the process in order to send individual measurements to the database to ensure some results are captured in the event that the assessment process is interrupted prior to all measurements being completed (such as the client terminating the process by closing their web browser or powering off the computer running the tests, network disconnection or failure or other factors). In 928, it is determined whether identifying information is to be provided for the results. For example, the user is asked whether they would like to provide identifying information to the content provider to be associated with their measurement results or to remain anonymous. In the event that identifying information is to be provided for the results, in 930 identifying information is provided. For example, client identifying information is collected from the user (e.g., identifying information of the client organization and/or the individual person running the performance assessment tool) and provided to the content provider server from the client system. In various embodiments this identifying information comprises a name, an email address, a telephone contact number, a content provider system tenant name, or any other appropriate client identifying information.

Figure 10:
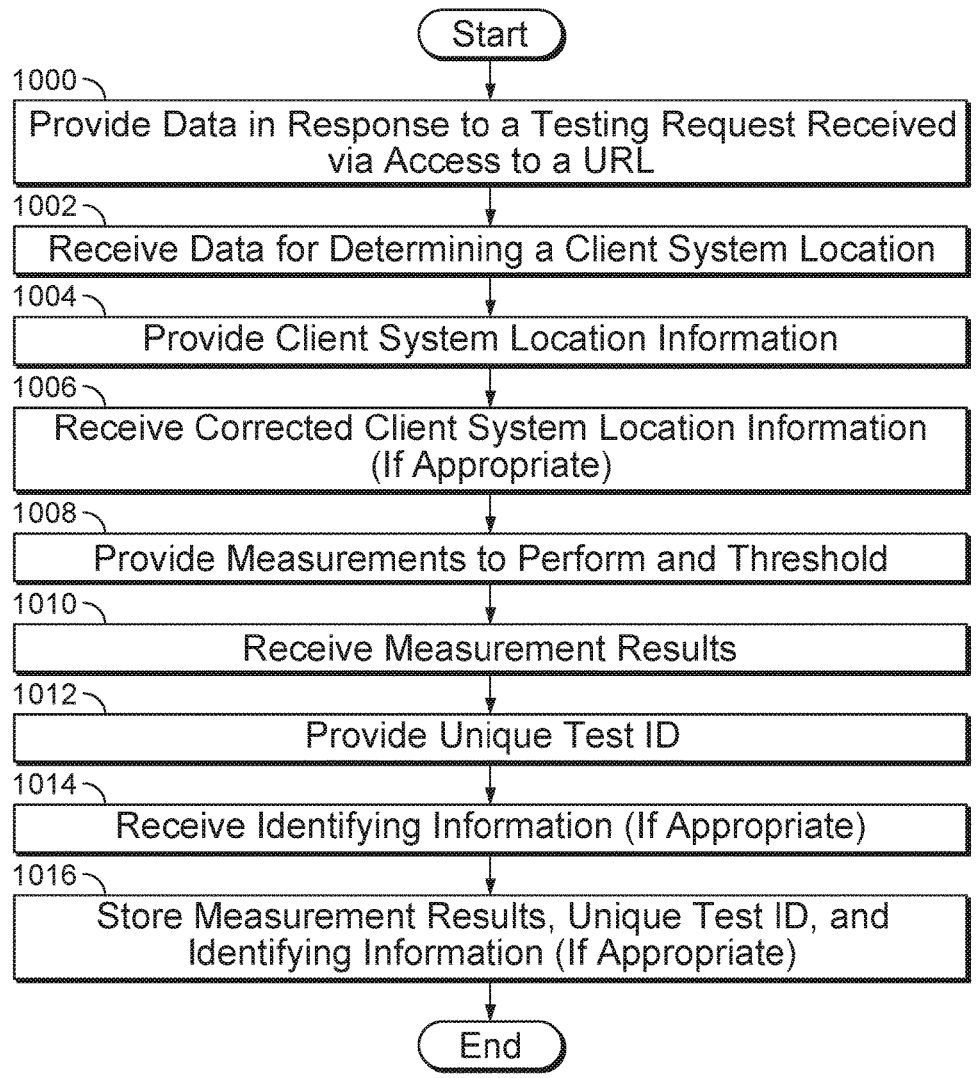
FIG. 10 is a flow diagram illustrating an embodiment of a process for receiving measurements from a plurality of client systems.

FIG. 10 is a flow diagram illustrating an embodiment of a process for receiving measurements from a plurality of client systems. In some embodiments, the process of FIG. 10 is performed by content provider 104 of FIG. 1. In the example shown, in 1000 data is provided in response to a testing request received via access to a URL. For example, a client system requests to run a performance assessment using an HTTPS request that contains a URL and the content provider system provides the client system a web page that contains both computer code and user instructions to perform the performance assessment. In 1002, data is received for determining a client system location. For example, data is received from the client system to aid in the location estimation (e.g., IP address, user agent header, etc.). In 1004, the client system is provided with location information. For example, client location is estimated using a database lookup, a third party service provider, a heuristic or a combination of these and other factors and this location estimate is provided to the client. In 1006, corrected client system location information is received (if appropriate). For example, in the event that the client indicates that the location information is not correct or can be more accurately described, the content provider system receives corrected location information from the client system. In 1008, measurements to perform and thresholds are provided. For example, a client system is provided measurements to perform (e.g., a variety of tests to a variety of targets) as well as thresholds to compare the test results to. In 1010, measurement results are received. In 1012, a unique test ID is provided. For example, a unique test ID is generated and provided associated with the measurement results that the client system generates and provides to the content provider system. In 1014, identifying information is received (if appropriate). For example, identifying information from the client system is received in the event that a user desires to provide identifying information. In 1016, measurement results, the unique test ID, and identifying information (if appropriate) are stored. For example, a content provider system stores test measurement results and associated information (e.g., compliance with thresholds, client information, etc.) in a database to aggregate test results.

In some embodiments, 1010 is repeated multiple times to receive individual measurement results from the client system. In the event that 1010 is repeated, subsequent test results received contain both the results and the test ID they should be associated with (provided to the client in the 1012) and 1012 is not re-run. In the event that 1010 is repeated, 1016 is run each time to store the incremental results as they are received, all associated with the same Test ID.

Figure 11:
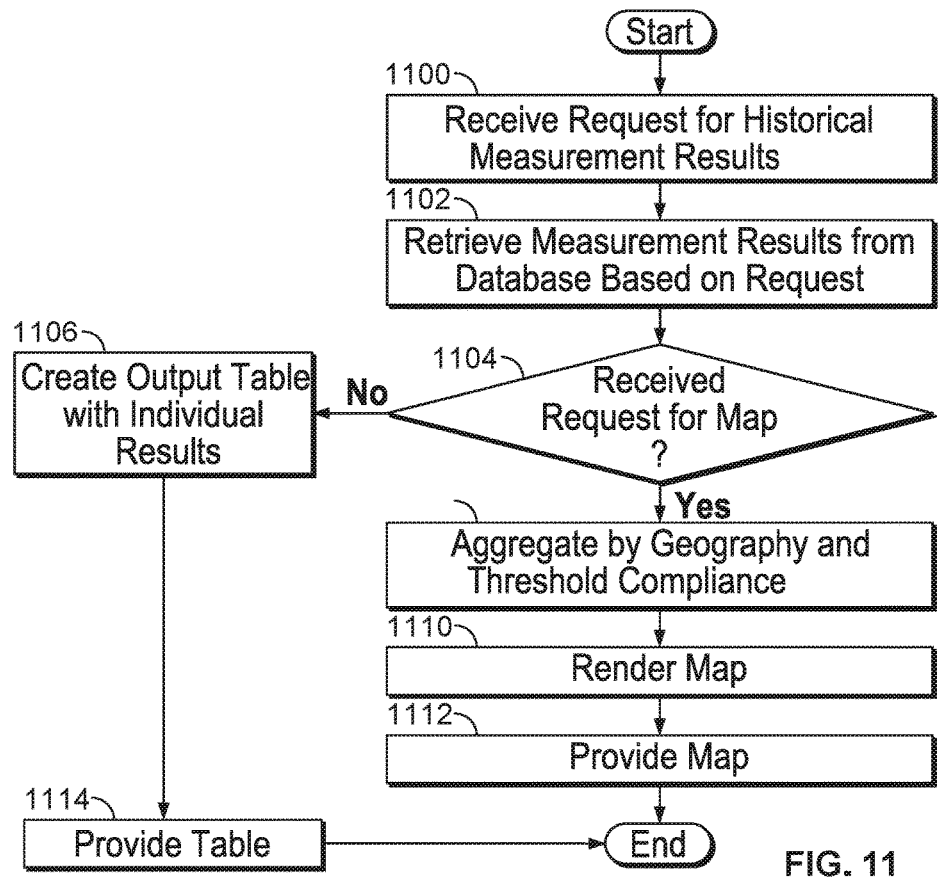
FIG. 11 is a flow diagram illustrating an embodiment of a process for retrieving historical measurement results either in detailed or aggregated form.

FIG. 11 is a flow diagram illustrating an embodiment of a process for retrieving historical measurement results either in detailed or aggregated form. In some embodiments, the process of FIG. 11 is implemented by content provider 104 of FIG. 1. In the example shown, in 1100, a request for historical measurement results is received. For example, a request is received for historical measurement results including a request for detailed per-test information or aggregated information summarized by one or more factors, criteria for limiting the scope of the results to be retrieved such as a date and time range, a list of geographical locations a list of ISPs or AS identifiers or other relevant criteria. In 1102, measurement results are retrieved based on the request (e.g., the request in 1100). For example, the relevant historical measurement results are retrieved from the content provider's database. In 1104, it is determined whether a map request is received. In the event that it is determined that a map request is not received, then in 1106 an output table is created with individual results and in 1114 the table is provided and the process ends. For example, an output table is created with detailed per-measurement results or an aggregation of results, such as could be used to estimate performance. In some embodiments, the measurement data is formatted into a table grouped in an appropriate way such as by client location and instance of the performance assessment tool usage. In the event that it is determined that a map request is received, then control passes to 1108 in which measurement results are aggregated by geography and threshold compliance. In 1110, a map is rendered. In some embodiments, the output map created in 1110 comprises regions of aggregated data. In various embodiments, regions of aggregated data comprise aggregated representations of compliance of the measured performance against the defined thresholds within each region. In some embodiments, the output map created in 1110 depicts the results of an individual measurement. In some embodiments, aggregate data values are indicated on the map (e.g., by a color, by a pattern, by a shading, by an indicating marker, using text, etc.). In some embodiments, the map comprises performance associated with an individual measurement from a client location to one or more target systems such as the content provider's servers, content distribution network edge nodes or other target systems identified during the use of the performance assessment tool with measurement results and their compliance against the relevant thresholds depicted using various visual representations (e.g., using line pattern, line thickness, line color, text, etc.). In some embodiments, the map comprises the aggregation of comparisons between measurement results and their relevant thresholds and averaging or otherwise consolidating that result for a region (e.g., the map comprises aggregated threshold compliance data). In 1112, the map is provided. For example, the map is provided for display to a user by a client system.

Figure 12:
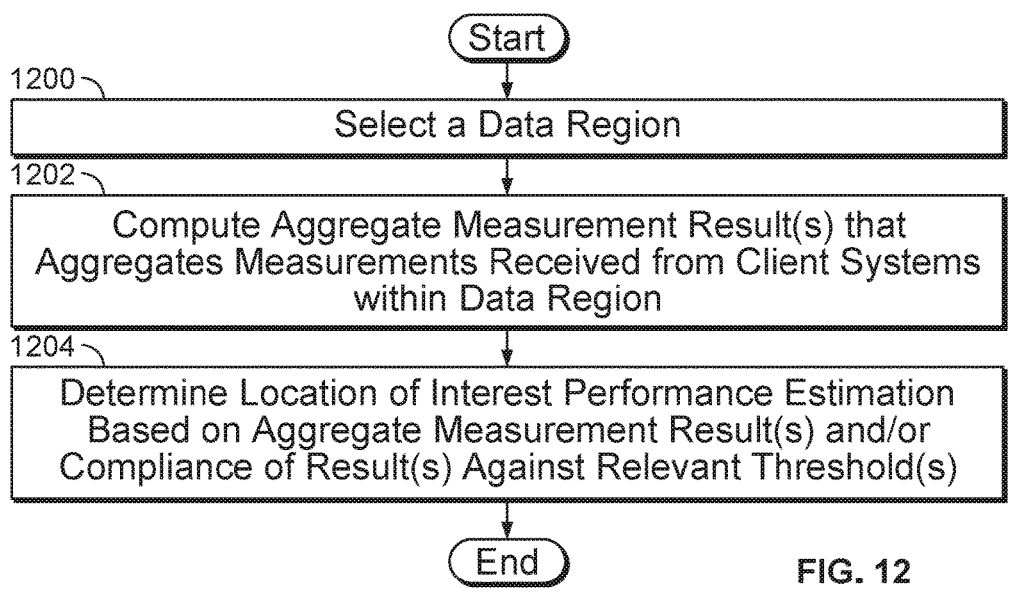
FIG. 12 is a flow diagram illustrating an embodiment of a process for estimating client system web interaction performance based at least in part on the aggregation of a plurality of client system locations and associated measurement results.

FIG. 12 is a flow diagram illustrating an embodiment of a process for estimating web interaction performance for a location of interest based at least in part on the aggregation of a plurality of client system locations and associated measurement results. In some embodiments, the process of FIG. 12 implements 1108 of FIG. 11. In the example shown, in 1200, a data region is selected. For example, a data region is selected where the selection is provided by the user or by a process iterating over data regions within a higher level region (such as states, provinces or regions within a country, countries within a continent or region, countries within the world, regions within the world etc.). In some embodiments, a data region comprises a country, state, county, province, tract, city, suburb or other governmental region. In some embodiments, a data region comprises a region with predetermined boundaries not entirely corresponding to governmental boundaries such as a continent or a multi-continent region. In some embodiments, a data region comprises a non-geographical identifier or groups of identifiers such as an Internet Service Provider (ISP), an Autonomous System Number (AS) an IP address range or subnet. In some embodiments, a data region comprises a region determined to include at least a threshold number of client system locations of the plurality of client system locations (e.g., the nearest 50 client system locations to a location of interest, etc.). In 1202, aggregate measurement result(s) that aggregates measurements received from client systems within the data region is computed. In some embodiments, computing an aggregate performance data comprises computing a statistical aggregate (e.g., mean, median, etc.) of each of a plurality of measurement results or the compliance of such results against relevant thresholds. In some embodiments, the plurality of measurement results comprises the set of tests performed in FIG. 9. In 1204, a location of interest performance estimation is determined based at least in part on the aggregate measurement results or the compliance of such results against relevant thresholds. In some embodiments, the location of interest performance estimation comprises the aggregate measurement result data. In some embodiments, the location of interest performance estimation is modified to include other information about the client systems within the location of interest (e.g., organization type, connection type, computer hardware information, etc.).

FIG. 13 is a block diagram illustrating an embodiment of an output table. In some embodiments, the output table of FIG. 13 comprises an output table created in 1106 of FIG. 11. In the example shown, the output table of FIG. 13 comprises a list of performance assessment result data. Output table 1300 comprises a set of rows, each row corresponding to a performance assessment. Each row of output table 1300 comprises a test ID (e.g., test IDs listed in test ID column 1302), a timestamp (e.g., timestamp IDs listed in timestamp column 1304), a country or region or other geographical or non-geographical identifier (e.g., country or region names listed in country column 1306), a number of measurements completed where the measurement results fall within the relevant threshold for good results (e.g., number of good results listed in good test column 1308), a number of measurements completed where the measurement results fall within the relevant threshold for ok results (e.g., number of ok test results listed in ok test columns 1310), and a number of measurements completed where the measurement results fall within the relevant threshold for bad results (e.g., number of bad results listed in bad test columns 1312). In some embodiments, a test ID (e.g., a test ID in test ID column 1302) comprises a unique test ID associated with the test for the purpose of identifying it. A timestamp (e.g., a timestamp in timestamp column 1304) comprises a timestamp indicating when the performance assessment test was run, either in the time zone of the user performing the test or adjusted to the time zone of the administrator viewing the output table or another relevant time zone. A country, region or other geographical or non-geographical identifier (e.g., country or region in country column 1306) comprises an indication of the country, geographical region or non-geographical region where the client system running the performance assessment test is located. In some embodiments, data shown in output table 1300 comprises summary data (e.g., an individual run of a performance assessment test produces more data than can be shown in output table 1300, each line of output table 1300 displays a summary of a performance assessment test). In some embodiments, the complete results of an individual performance assessment test can be accessed via output table 1300 (e.g., by clicking on test ID data, timestamp data, etc.).

FIG. 14A is a diagram illustrating an embodiment of part of an output table. In some embodiments, the partial output table of FIG. 14 comprises part of an output table created in 1106 of FIG. 11. In the example shown, table 1400 comprises header information 1402, comprising a test ID, a client email address, a client ID, a client external IP address, a client internal IP address, and a client detected location and the client's actual location if specified by the user running the performance assessment tool that generated the measurement results. Table 1400 additionally comprises set of measurement results. In the example shown, the set of measurement results comprises an Internet facing DNS server—IP address (e.g., IP address of 203.0.113.1, no information), Internet facing DNS server—provider (e.g., Example Company Public DNS Service, no information), Internet facing DNS server—location (e.g., Tokyo, JP—8,186 KM Away, Bad), Internet facing DNS server—EDNS0 reported client subnet (e.g., 198.51.100.0/24, no information), Internet facing DNS server—EDNS0 subnet location (e.g., Melbourne Victoria, AU—0 km Away, Good), CDN Provider A—edge node location (e.g., Melbourne, Victoria, AU—0 km Away (192.0.2.111), Good), CDN Provider A—sustained latency (e.g., Min: 40.6 ms, Med: 601.015 ms, Max: 2524.3 ms, Bad), and CDN Provider A—sustained download bandwidth (e.g., 1.7975 Mbps (216.70 Mb in 964.5 secs), Good). In the example shown, each test result comprises the result data and a threshold compliance (e.g., "No Information", "Good", "OK", or "Bad"). In some embodiments, a user can receive further information about a test result by clicking on the test evaluation box (e.g., a user can click on the "Bad" evaluation in order to learn what about the test result makes it bad, and potentially what steps can be taken by the user or the user's network administrators to correct or improve the results). In some embodiments, each test result additionally comprises a help box, wherein a user can receive further information about the test by clicking on the help box. In the example shown, latency data shows a minimum, median, and maximum latency test result over a set of latency tests. Bandwidth data shows the total amount of data transferred, the period of time over which it was transferred, and the maximum sustained download bandwidth.

FIG. 14B is a diagram illustrating an embodiment of part of an output table. In some embodiments, the partial output table of FIG. 14B comprises part of an output table created in 910 of FIG. 9. In some embodiments, the partial output table of FIG. 14B comprises a continuation of the output table of FIG. 14A. In the example shown, the partial output table of FIG. 14B comprises test results 1450. Test results 1450 comprises a CDN Provider B—edge node location (e.g., Sydney, New South Wales, AU—713 km away, OK), CDN Provider B—sustained latency (e.g., Min: 31.2 ms, Med: 563.285 ms, Max: 954.4 ms, Bad), CDN Provider B—sustained download bandwidth (e.g., 3.2691 Mbps (369.67 Mb in 904.6 secs), Good), Content Provider Data Center Location A—Sustained latency (e.g., 264.8 ms, Med: 310.470 ms, Max: 568.5 ms, Bad), Content Provider Data Center Location A—Sustained Download Bandwidth (e.g., 2.9121 Mbps (331.43 Mb in 910.5 secs), Good), Content Provider Data Center Location B—Sustained Latency (e.g., Min: 353.9 ms, Med: 483.14 ms, Max: 743.5 ms, Bad), Content Provider Data Center Location B—Sustained Download Bandwidth (e.g., 1.3424 Mbps (152.97 Mb in 911.6 secs, Good).

Figure 15:
FIG. 15 is a diagram illustrating an embodiment of an output map.

FIG. 15 is a diagram illustrating an embodiment of an output map. In some embodiments, the output map of FIG. 15 comprises an output map created in 1110 of FIG. 11. In the example shown, map 1500 comprises header information 1502, comprising a test ID, a client email address, a client ID, a client external IP address, a client internal IP address, and a client detected location. Map 1500 additionally comprises a world map indicating a set of relevant locations. In the example shown, map 1500 displays the location of the client system whose results are being examined, as well as the locations of each target system to which measurements were performed, such as CDN Provider A Edge Node, CDN Provider B Edge Node, Content Provider Data Center Location A and Content Provider Data Center Location B.

Figure 16:
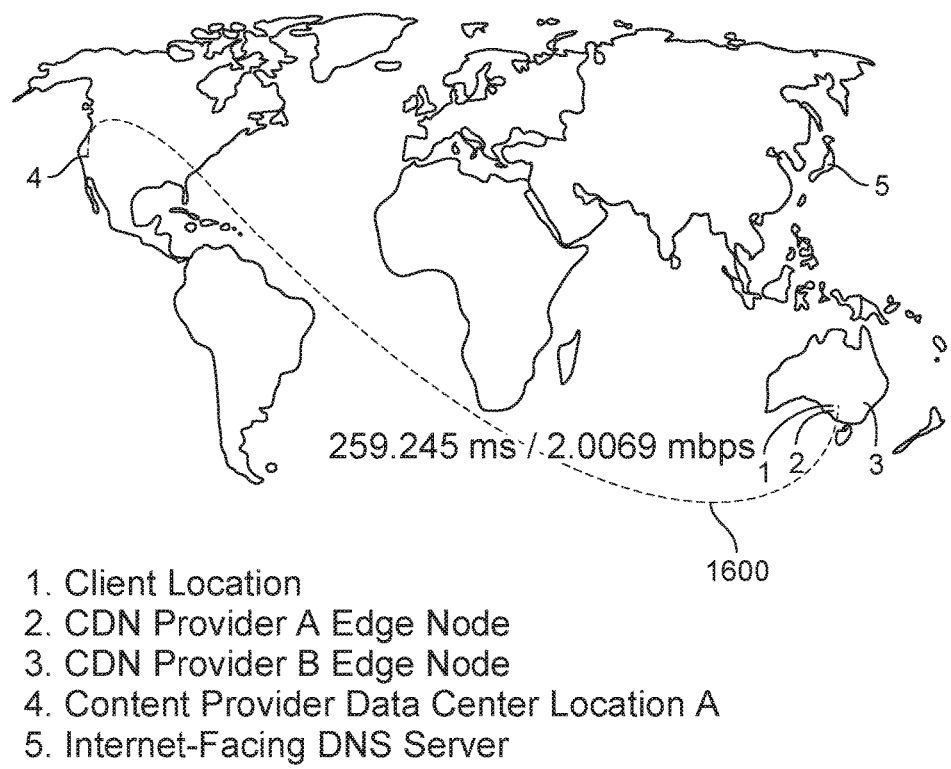
FIG. 16 is a diagram illustrating an embodiment of an output map.

FIG. 16 is a diagram illustrating an embodiment of an output map. In some embodiments, the output map of FIG. 16 comprises the output map of FIG. 15 additionally showing measurement results. In the example shown, line 1600 displays a theoretical connection path (e.g., from (4) Content Provider Data Center Location A to (1) Client Location) and the results of the measurements performed against this connection (e.g. latency 259.245 ms, and bandwidth 2.0069 mbps) from the selected client system. In this example the path is shown as a direct link between (4) Content Provider Data Center Location A to (1) Client Location, however should further information about the actual path the network traffic followed between the end points is available (such as the result of detecting network routers along the connection path), this could be shown as a multi-step line with each intermediate network device's detected or estimated geographical location forming a step in the line.

FIG. 17 is a diagram illustrating an embodiment of an output map. In the example shown, the output map of FIG. 17 displays aggregated measurement data and/or aggregated compliance rates of the measurement data against the relevant thresholds. In this example, aggregated measurement data compliance against thresholds is shown grouped by subcontinent. Subcontinents whose aggregate threshold compliance average is good are displayed with a stripe pattern indicating good, subcontinents whose aggregate threshold compliance average is ok with a stripe pattern indicating ok, subcontinents whose aggregate threshold compliance average is bad are displayed with a stripe pattern indicating bad, and subcontinents with insufficient data for analysis are shown with no pattern. In the example shown, North America and Europe have good performance, Africa and Australia have ok performance, Asia has bad performance, and the Middle East and South America have insufficient data. In some embodiments, this map could be rendered to aggregate only specific measurements such as latency, bandwidth or data integrity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for estimating client system web interaction performance, comprising:
   a processor; and
   a memory coupled with the processor, wherein the memory is configured to provide the processor with instructions which when executed cause the processor to:
   receive a plurality of client system locations and associated performance data; and
   receive a location of interest;
   determine an estimated client system web interaction performance based at least in part on the plurality of client system locations and the associated performance data and the location of interest, wherein the associated performance data is determined based at least in part on determining an internet facing DNS server from a client system location of the plurality of client system locations using an ID code and a testing URL, wherein the determining of the internet facing DNS server comprises to:
   receive, from the internet facing DNS server, a DNS lookup request of the testing URL to resolve an IP address of a detection host name included in the testing URL, the DNS lookup request including an IP address of the internet facing DNS server, the detection host name including the ID code;
   store, in a database, the IP address of the internet facing DNS server and the ID code;
   receive, using a web server, a request for a webpage, the request including the ID code; and
   return, using the web server, the webpage including the IP address of the internet facing DNS server based on the ID code; and
   provide the estimated client web interaction performance based on the IP address of the internet facing DNS server.

2. The system of claim 1, wherein the processor is further to provide a map.

3. The system of claim 2, wherein the map comprises regions of aggregated data.

4. The system of claim 3, wherein the data comprises quality of service data.

5. The system of claim 3, wherein the data comprises suboptimal performance data.

6. The system of claim 3, wherein the data comprises performance assessment results.

7. The system of claim 2, wherein aggregated data values are indicated on the map.

8. The system of claim 7, wherein aggregated data values are indicated on the map using a color.

9. The system of claim 7, wherein aggregated data values are indicated on the map using a pattern.

10. The system of claim 2, wherein the map comprises performance associated with a static target system or a dynamic target system.

11. The system of claim 10, wherein the performance associated with the static target system or dynamic target system is indicated using a line pattern.

12. The system of claim 10, wherein the performance associated with the static target system or dynamic target system is indicated using a line thickness.

13. The system of claim 2, wherein the map comprises a result of a performance assessment estimation.

14. The system of claim 1, wherein the processor is further to provide a table of data.

15. The system of claim 14, wherein the table of data comprises a list of performance assessment result data.

16. The system of claim 14, wherein the table of data comprises aggregated performance assessment result data.

17. The system of claim 14, wherein the table of data comprises a result of an individual performance assessment.

18. The system of claim 14, wherein the table of data comprises a result of a performance assessment estimation.

19. A method for estimating a client system web interaction performance, comprising:
   receiving a plurality of client system locations and associated performance data; and receive a location of interest; and determining, using a processor, an estimated web interaction performance based at least in part on the plurality of client system locations and the associated performance data and the location of interest, wherein the associated performance data is determined based at least in part on determining an internet facing DNS server from a first client system location of the plurality of client system locations using an ID code and a testing URL, wherein the determining of the internet facing DNS server comprises:

receiving, from the internet facing DNS server, a DNS lookup request of the testing URL to resolve an IP address of a detection host name included in the testing URL, the DNS lookup request including an IP address of the internet facing DNS server, the detection host name including the ID code;

storing, in a database, the IP address of the internet facing DNS server and the ID code;

receiving, using a web server, a request for a webpage, the request including the ID code; and returning, using the web server, the webpage including the IP address of the internet facing DNS server based on the ID code; and provide the estimated client web interaction performance based on the IP address of the internet facing DNS server.

20. A computer program product for estimating client system web interaction performance, the computer program product being embodied in a non-transitory computer readable storage medium and comprising computer instructions for:

receiving a plurality of client system locations and associated performance data; and receive a location of interest; and determining, using a processor, an estimated client web interaction performance based at least in part on the plurality of client system locations and the associated performance data and the location of interest, wherein the associated performance data is determined based at least in part on determining an internet facing DNS server from a first client system location of the plurality of client system locations using an ID code and a testing URL, wherein the determining of the internet facing DNS server comprises:

receiving, from the internet facing DNS server, a DNS lookup request of the testing URL to resolve an IP address of a detection host name included in the testing URL, the DNS lookup request including an IP address of the internet facing DNS server, the detection host name including the ID code;

storing, in a database, the IP address of the internet facing DNS server and the ID code;

receiving, using a web server, a request for a webpage, the request including the ID code; and returning, using the web server, the webpage including the IP address of the internet facing DNS server based on the ID code; and provide the estimated client web interaction performance based on the IP address of the internet facing DNS server.

\* \* \* \* \*

UNITED STATES PATENT AND TRADEMARK OFFICE
CERTIFICATE OF CORRECTION

PATENT NO. : 10,164,943 B1
APPLICATION NO. : 15/339700
DATED : December 25, 2018
INVENTOR(S) : Charles T. W. Phipps Page 1 of 1

It is certified that error appears in the above-identified patent and that said Letters Patent is hereby corrected as shown below:

In the Specification

In Column 3, Line 1, before "target", insert --plurality of--.

Signed and Sealed this
Twenty-eighth Day of May, 2019

Andrei Iancu
*Director of the United States Patent and Trademark Office*